(No Model.)
J. A. LANTZ.
COUPLING FOR ELECTRICAL WIRES.
No. 349,398. Patented Sept. 21, 1886.
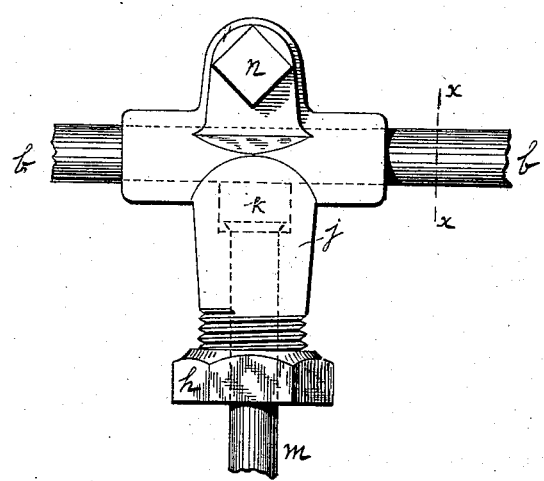
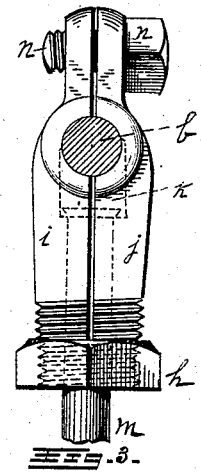
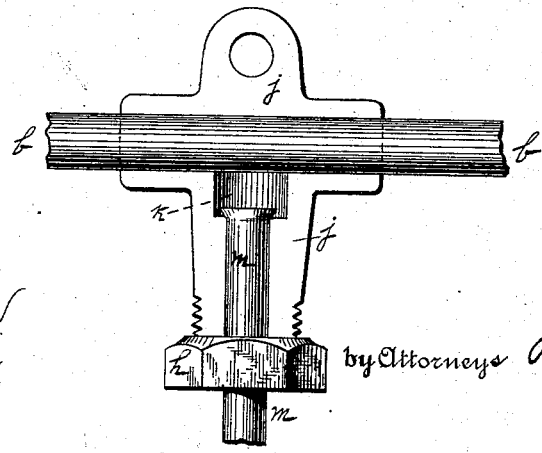

UNITED STATES PATENT OFFICE.

JOHN A. LANTZ, OF PITTSBURG, PENNSYLVANIA, ASSIGNOR TO GEORGE T. OLIVER, OF SAME PLACE.

COUPLING FOR ELECTRICAL WIRES.

SPECIFICATION forming part of Letters Patent No. 349,398, dated September 21, 1886.

Application filed June 26, 1886. Serial No. 206,332. (No model.)

*To all whom it may concern:*

Be it known that I, JOHN A. LANTZ, of Pittsburg, in the county of Allegheny and State of Pennsylvania, have invented a new and useful Improvement in Coupling for Electrical Wires; and I do hereby declare the following to be a full, clear, and exact description thereof.

The object of my invention is to provide a simple and easily-adjusted device for attaching branch wires in electric lighting systems to the main line-wires.

I will describe my improvement with reference to the accompanying drawings, in which Figure 1 is a side view of the coupling. Fig. 2 is a vertical cross-section on the line $x$ $x$ of Fig. 1. Fig. 3 is a plan view of one of the sections of the coupling, showing the wires in position therein.

Like symbols of reference indicate like parts in each.

In the drawings, $b$ is the line-wire, and $m$ is the branch wire leading therefrom. The coupling is of angular or T form, made in two grooved longitudinal sections, $i$ and $j$, which, when placed together, as shown in Figs. 1 and 2, afford a cylindrical bore through the arms of the T for the line-wire, and a transverse bore through the shank of the T for the branch wire. At the inner end of the latter bore is an enlarged recess, $k$, made by enlarging the grooves of the sections $i$ and $j$ at the proper point.

In applying the coupling, the parts are placed together on both the line-wire and the branch wire, so that the former shall be in the bore in the head of the T, and that the branch shall be in the transverse bore, the end of the branch wire which is upset or flanged being in the recess $k$. The sections of the coupling are then suitably locked together, preferably by a screw cap or ring, $h$, at one end, and by a bolt, $n$, at the other. These clamp the coupling on the wires, and as the coupling is metallic it establishes electrical communication between them.

The advantages of my improvement will be apparent to those skilled in the art. The coupling is easily attached and disconnected, and by its use any of the branch wires may be disconnected without trouble, and without interfering with the operations of the system. Its employment results in a great saving of time and expense, especially on the heavy wires ordinarily used in systems of incandescent lamp lighting.

I claim—

1. A coupling for connecting an electrical branch wire with the line-wire, consisting of a socket which incloses both the branch wire and the line-wire, said socket being made in separable parts, substantially as and for the purposes described.

2. A coupling for connecting an electrical branch wire with the line-wire, consisting of an angular socket made in separable parts, substantially as and for the purposes described.

3. A coupling for connecting an electrical branch wire with the line-wire, consisting of an angular socket made in separable parts, and having an internal enlarged recess for the flanged head of the branch wire, substantially as and for the purposes described.

In testimony whereof I have hereunto set my hand this 22d day of June, A. D. 1886.

JOHN A. LANTZ.

Witnesses:
THOMAS W. BAKEWELL,
W. B. CORWIN.